E. DAVIDSON.
ATTACHMENT FOR PLOWS.
APPLICATION FILED DEC. 18, 1916.
1,273,829.
Patented July 30, 1918.
2 SHEETS—SHEET 1.
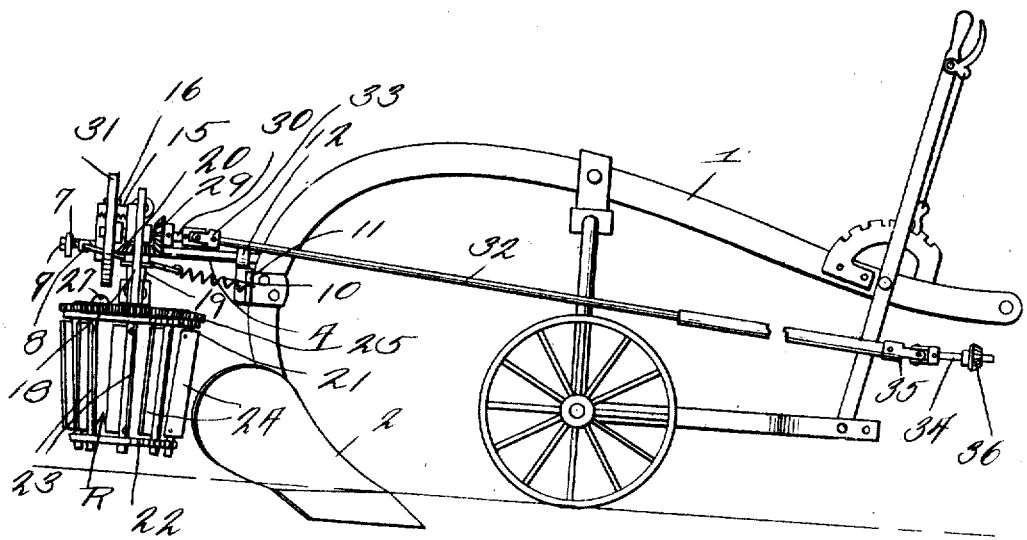
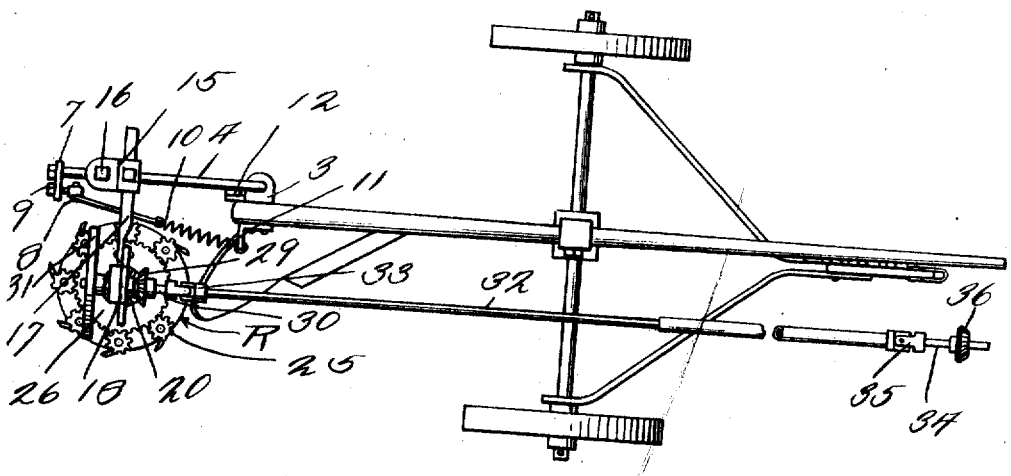
Witness
B. S. Brown
M. L. Peak
Inventor
E. Davidson
By Chandler Chandler
Attorneys

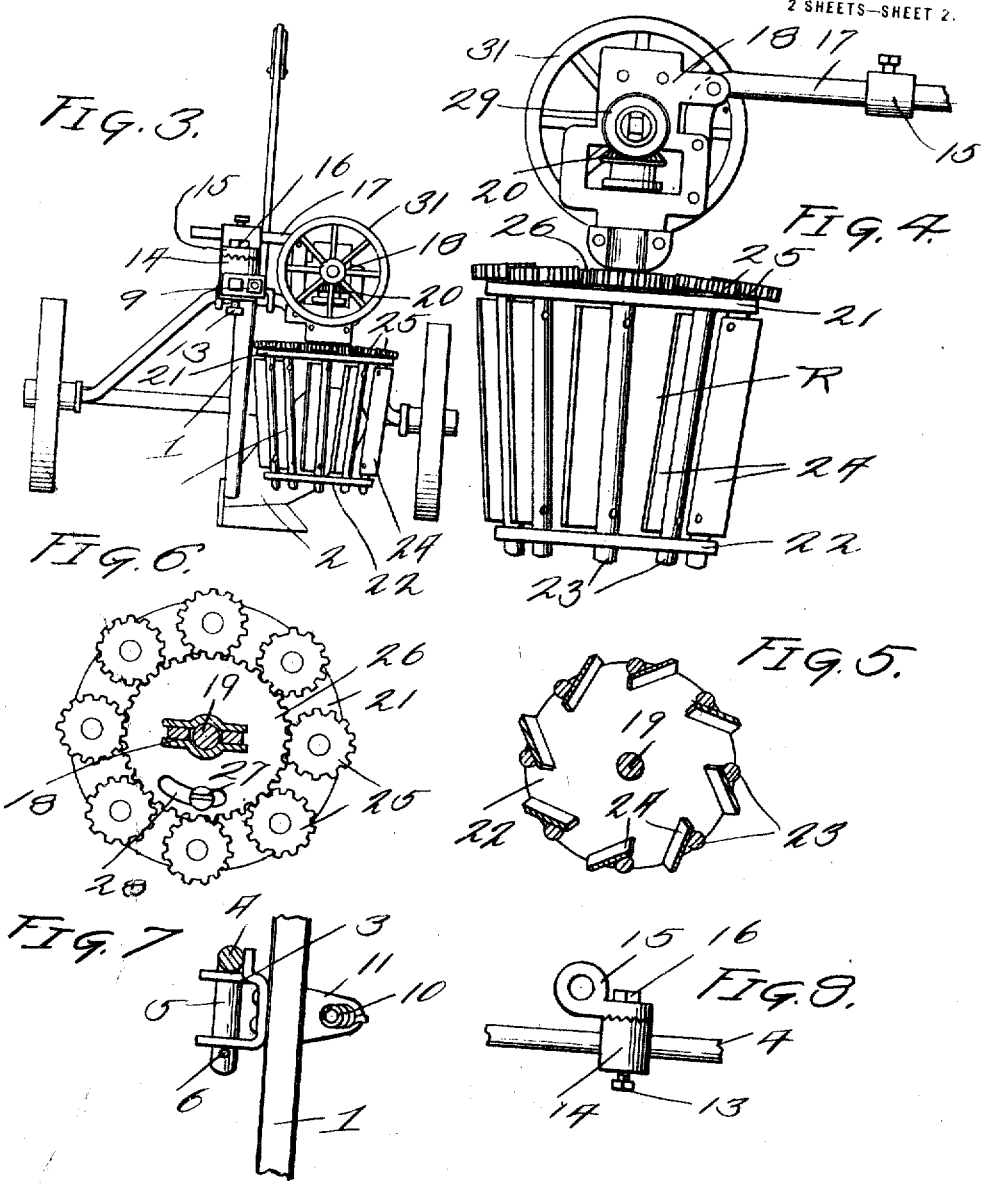

UNITED STATES PATENT OFFICE.

EMIL DAVIDSON, OF NORTHWOOD, NORTH DAKOTA.

ATTACHMENT FOR PLOWS.

1,273,829.  Specification of Letters Patent.  Patented July 30, 1918.

Application filed December 18, 1916. Serial No. 137,647.

*To all whom it may concern:*

Be it known that I, EMIL DAVIDSON, a citizen of the United States, residing at Northwood, in the county of Grand Forks, State of North Dakota, have invented certain new and useful Improvements in Attachments for Plows; and I do hereby declare the following to be a full, clear, and exact description of the invention, such as will enable others skilled in the art to which it appertains to make and use the same.

This invention relates to an attachment for plows and is in the nature of an improvement of the construction disclosed in my Patent No. 969,091, dated August 30, 1910.

An object of the invention resides in the provision of an improved mechanism for assisting the mold board of the plow in turning the earth uplifted from the furrow.

A further object of the invention resides in so constructing the device that the soil as it is turned may be cut or so that it may be turned smoothly.

A further object of the invention resides in the general improvement of the structure of devices of this class and in so constructing the particular device that it may be attached to various plows now in use.

With these and other objects in view, such as will appear as my description progresses, my invention comprises the combination and arrangement of parts as set forth in and falling within the scope of the appended claims.

In the drawings:

Figure 1 is a side elevation of a plow showing my attachment in place thereon;

Fig. 2 is a plan view of the same;

Fig. 3 is a rear elevation;

Fig. 4 is an enlarged view of the turning roller;

Fig. 5 is a horizontal sectional view taken therethrough showing the positions of the knives;

Fig. 6 is a similar view showing the knife adjusting mechanism;

Fig. 7 is a detail showing the manner in which the roller carrying arm is mounted on the plow beam, and Fig. 8 is a fragmental detail.

The plow illustrated in the drawing includes a beam 1 which carries a plow 2, which plow includes a land side and a mold board.

I have provided a bearing member 3 on the plow beam 1, which bearing member has a pair of vertically alined apertures therein. Pivotally mounted in this bearing member is an arm 4 which has a finger 5 extending through the alined apertures, in said bearing member which finger is held therein by a cotter pin 6. Secured to the end of the arm 4 is an arm 7 through which an eye bolt 8, having a nut 9 thereon, slidably extends. To the end of this eye bolt 8 a coil spring 10 is attached, which spring extends and is attached to an ear 11 on the plow beam 1. The purpose of this spring, the tension of which may be varied by the nut 9, is to draw the arm 4 into engagement with a stop shoulder 12, which stop shoulder limits the movement of the arm so that it extends rearwardly and parallel to the plane of the beam 1. Adjustably secured to the arm 4 by means of a set screw 13 is a block 14 which is provided with a plurality of radial serrations in its upper face for the adjustable engagement of a casting 15 with said block 14, the casting being mounted on this block 14 and is held in any of its rotative positions by means of a fastener 16 which draws the serrations, which are formed on the casting, tightly into engagement with the serrations on the block. This casting 15 is adjustably mounted in any suitable manner on a bracket 17 to which a frame 18 is secured. Depending from and rotatably mounted in this frame 18 is a shaft 19 on the upper end of which a beveled gear 20 is secured. A roller R is secured to this shaft 19, which roller includes a circular upper plate 21 and a similar but smaller lower plate 22. Extending between these plates adjacent to the peripheries thereof are small rollers 23 each of which has a knife 24 secured thereto. The upper end of each of these rollers 23 is provided with a pinion 25, which pinions mesh with a gear 26. This gear 26 is secured to the upper plate 21 by a set screw 27 which passes through an elongated arcuate slot 28 in the gear. The teeth of the gear intermesh with the teeth of the pinions 25 so that by loosening the screw 27 and turning the gear 26 the knives 24 may be either turned to extend into the cylinder or to extend therefrom. A pinion 29 intermeshes with the gear 20, which pinion is secured to a shaft 30 on one end of which is a balance wheel 31 and the other end of which is connected to a shaft 32 by a universal joint 33. This shaft 32 is formed of two telescopic members so that the effective lengths may be varied as the necessity arises. This shaft is connected to a pinion shaft 34 by a pivotal joint 35, on which shaft 34 a pinion 36 is secured. This pinion is adapted to intermesh with a beveled gear on the tractor not shown. The roller R extends downwardly across the rear upper edge of the mold board of the plow when it is in its normal operative position.

When the device is in use the plow is drawn in the usual manner and the roller R will be in the position last mentioned, being held in such position by the spring 10. The knives 24 may either be extended from or positioned within the roller R. In the former case the uplifted earth from the furrow will be cut while in the latter case it will merely be rolled over smoothly. In either case, however, the turning over of the earth from the furrow by the mold board of the plow will be materially assisted. When the roller R comes into contact with a stone or other immovable body it will be permitted to swing with relation to the plow beam 1 on the finger 5 as a pivot, the spring 10 at this time being extended. When, however, the obstruction is passed the spring 10 will operate to again move the roller R to its normal position.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. A plow attachment comprising a bracket adapted for attachment to the plow beam and having a stop thereon, an arm rotatably mounted in said bracket, a spring for normally maintaining said arm in contact with said stop, a bracket adjustably secured to said arm, a roller carried by said bracket, which roller comprises a pair of plates and a plurality of knife carrying rollers extending between said plates and means for rotating the first mentioned roller.

2. In an attachment for plows, a roller comprising a pair of spaced plates, a plurality of rollers extending between and rotatably mounted in said plates, a knife mounted on each of said last mentioned rollers, means for adjusting said last mentioned rollers and means for maintaining them in their adjusted positions.

3. In an attachment for plows, a turning roller including a plurality of spaced converging rollers having knives thereon and means for adjusting the knives to extend at various angles from the turning roller.

4. The combination with a plow including a mold board and a land side, of a turning roller including a plurality of spaced converging rollers and mounted above the edge of the mold board, means for resiliently holding said roller in such position and means for varying the position of the roller.

In testimony whereof I affix my signature in the presence of two witnesses.

EMIL DAVIDSON.

Witnesses:
 OLE O. TRAGETON,
 A. O. TRAGETON.